(12) United States Patent
Miura et al.

(10) Patent No.: US 9,973,931 B2
(45) Date of Patent: May 15, 2018

(54) MOBILE TERMINAL, DISPLAY CONTROL METHOD, AND NON-TRANSITORY COMPUTER-READABLE RECORDING MEDIUM

(71) Applicant: KYOCERA Corporation, Kyoto (JP)

(72) Inventors: Saya Miura, Yokohama (JP); Kazuki Morita, Machida (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 15/421,719

(22) Filed: Feb. 1, 2017

(65) Prior Publication Data

US 2017/0223543 A1 Aug. 3, 2017

(30) Foreign Application Priority Data

Feb. 3, 2016 (JP) ................. 2016-018894

(51) Int. Cl.
*H04W 12/08* (2009.01)
*H04M 1/725* (2006.01)

(52) U.S. Cl.
CPC ......... *H04W 12/08* (2013.01); *H04M 1/7258* (2013.01); *H04M 1/72583* (2013.01); *H04M 2201/14* (2013.01)

(58) Field of Classification Search
CPC .... H04M 1/673; H04M 1/67; H04M 2250/22; H04M 1/7258; H04M 1/72583; G06F 1/1626; G06F 1/1692; G06F 3/0357; G06F 21/36; H04W 12/08
See application file for complete search history.

(56) References Cited

U.S. PATENT DOCUMENTS

| | | | |
|---|---|---|---|
| 9,451,069 B2 * | 9/2016 | Inukai | G06F 1/1626 |
| 9,521,248 B2 | 12/2016 | Kobayashi et al. | |
| 2014/0221050 A1 * | 8/2014 | Kato | G06F 1/1626 455/566 |
| 2015/0082252 A1 * | 3/2015 | Chaudhri | G06F 3/04883 715/847 |
| 2015/0207922 A1 | 7/2015 | Kobayashi et al. | |

FOREIGN PATENT DOCUMENTS

| | | |
|---|---|---|
| JP | 2012-048283 A | 3/2012 |
| JP | 2014-021936 A | 2/2014 |
| JP | 2014-067247 A | 4/2014 |
| JP | 2015-135614 A | 7/2015 |
| JP | 2015-188137 A | 10/2015 |

* cited by examiner

*Primary Examiner* — Nizar Sivji
(74) *Attorney, Agent, or Firm* — Studebaker & Brackett PC

(57) ABSTRACT

The mobile terminal includes a display configured to display a lock screen and a controller configured to perform screen timeout when a non-operation state continues in the lock screen and also when the non-operation state continues in a screen other than the lock screen, wherein the controller sets the same predetermined time periods to a duration of the no-operation state in the lock screen before the screen timeout is performed and a duration of the non-operation state in the screen other than the lock screen before the screen timeout is performed.

5 Claims, 7 Drawing Sheets

MOBILE TERMINAL, DISPLAY CONTROL METHOD, AND NON-TRANSITORY COMPUTER-READABLE RECORDING MEDIUM

TECHNICAL FIELD

This disclosure relates to a communication terminal, a display control method, and a non-transitory computer-readable recording medium.

BACKGROUND

In recent years, smartphones having Android® (Android is a registered trademark in Japan, other countries, or both) installed therein as an OS have been popularly used, and there are a variety of technologies to improve user convenience (e.g., PLT 1).

CITATION LIST

Patent Literature

PLT 1: JP-A-2014-67247

SUMMARY

A mobile terminal according to one of the embodiments of this disclosure includes:
- a display configured to display a lock screen; and
- a controller configured to perform screen timeout when a non-operation state continues in the lock screen and also when the non-operation state continues in a screen other than the lock screen, wherein
- the controller sets the same predetermined time periods to a duration of the no-operation state in the lock screen before the screen timeout is performed and a duration of the non-operation state in the screen other than the lock screen before the screen timeout is performed.

A display control method according to one of the embodiments of this disclosure is a display control method of a mobile terminal, the display control method including:
- displaying a lock screen; and
- performing screen timeout when a non-operation state continues in the lock screen and also when the non-operation state continues in a screen other than the lock screen, wherein
- the same predetermined time periods are set to a duration of the no-operation state in the lock screen before the screen timeout is performed and a duration of the non-operation state in the screen other than the lock screen before the screen timeout is performed.

A non-transitory computer-readable recording medium according to one of the embodiments of this discloser includes computer program instructions, which when executed by a computer for functioning as a mobile terminal, cause the computer to:
- display a lock screen; and
- perform screen timeout when a non-operation state continues in the lock screen and also when the non-operation state continues in a screen other than the lock screen, wherein
- the same predetermined time periods are set to a duration of the no-operation state in the lock screen before the screen timeout is performed and a duration of the non-operation state in the screen other than the lock screen before the screen timeout is performed.

DETAILED DESCRIPTION

A conventional smartphone, when a screen other than a lock screen is displayed, performs screen timeout when a non-operation state continues for a predetermined time period A (e.g. 60 seconds) from when the non-operation state starts. On the other hand, when the lock screen is displayed, the conventional smartphone performs the screen timeout when the non-operation state continues for a predetermined time period B (e.g. 10 seconds) from when the non-operation state starts.

Here, the predetermined time period A and the predetermined time period B differ from each other. Such different time periods for screen timeout have been causing user's discomfort.

Therefore, it could be helpful to provide a mobile terminal, a display control method, and a non-transitory computer-readable recording medium which are capable of reducing user's discomfort before screen timeout.

The mobile terminal, the display control method, and the non-transitory computer-readable recording medium according to one embodiment may reduce user's discomfort before the screen timeout.

Hereinafter, one embodiment will be described.

Embodiment

In the following description of one embodiment, it is assumed that a mobile terminal according to the embodiment is a mobile phone of a feature-phone type having Android® (Android is a registered trademark in Japan, other countries, or both) installed therein as OS. Also, a mobile terminal of the feature-phone type is assumed herein as what is called a feature phone of a folding type (a flip type or a clamshell type), by way of example. Note that the disclosure is not limited to the mobile phone of the folding type but may be a feature phone of a slide type having a slide-out keyboard, or a feature phone of a bar type (a straight type).

Figure 1:
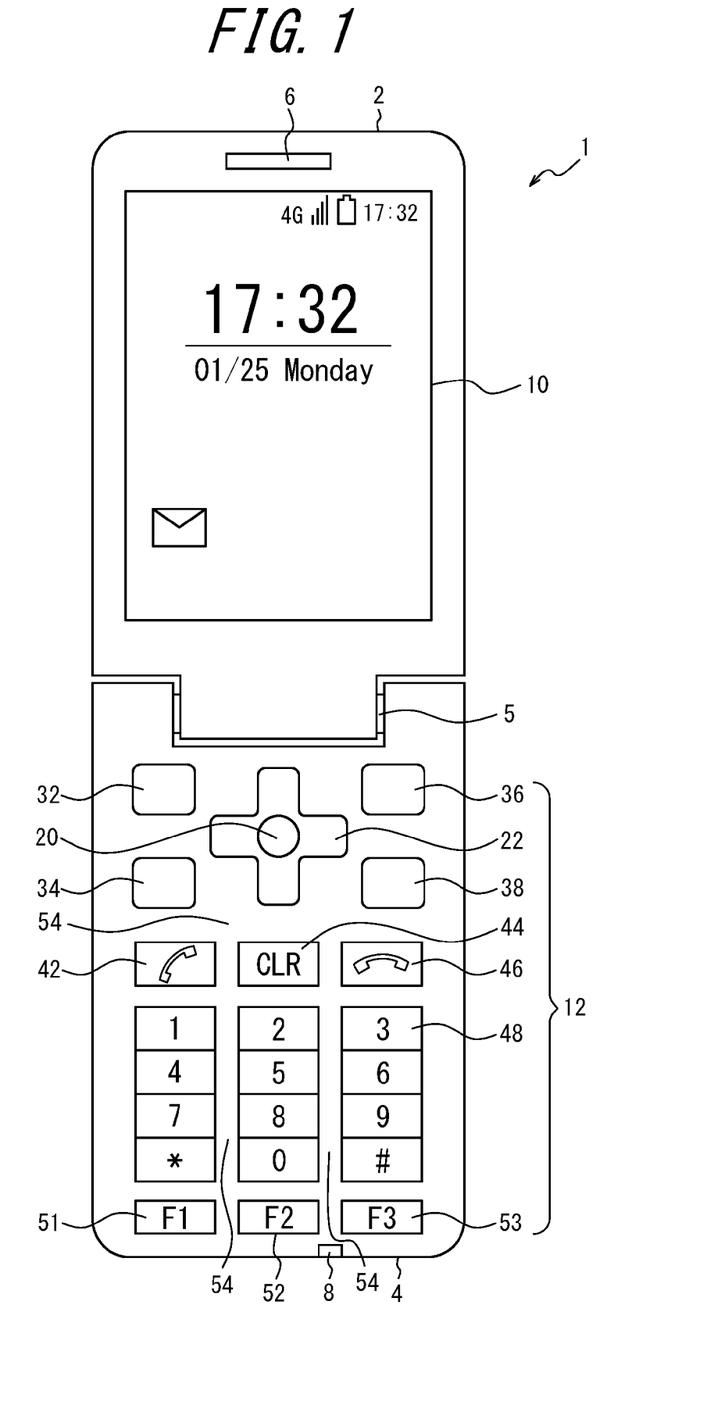
FIG. 1 is a diagram illustrating an external view of a mobile terminal according to one embodiment.

FIG. 1 is a diagram illustrating an external view of the mobile terminal according to one embodiment. As illustrated in FIG. 1, a mobile terminal 1 of the feature-phone type according to the present embodiment is the mobile terminal of the folding type having an upper housing 2 and a lower housing 4 joined together via a hinge 5. The mobile terminal 1 is structured in such a manner that the upper housing 2 and the lower housing 4 are foldable at the hinge 5 serving as a valley. Since the mobile terminal 1 may have an external structure similar to that of a conventionally well-known mobile phone of a folding feature-phone type, a further detailed description of the external structure of the mobile terminal 1 will be omitted.

As illustrated in FIG. 1, the mobile terminal 1 includes, in the upper housing 2, a speaker 6 and a display 10. Also, the mobile terminal 1 includes, in the lower housing 4, a microphone 8 and an operation unit 12 configured with various physical keys. The speaker 6 outputs voice to a user's ear during a phone call, and the microphone 8 obtains voice from the user's mouth during the phone call. Since the speaker 6 and the microphone 8 may be similar to those employed by general mobile phones, detailed descriptions of the speaker 6 and the microphone 8 will be omitted. The operation unit 12 detects an input by a user who is operating the mobile terminal 1.

The display 10 is a display device such as a liquid crystal display, an organic EL display, and an inorganic EL display. The display 10 may include a light source or a light-emitting element employed as a backlight. The display 10 displays, to the user operating the mobile terminal 1, various information such as a character, a symbol, an image, and a depicted operation object (an icon).

The operation unit 12 includes a center key (an OK key) 20 configured as one physical key, a direction key (a cursor key) 22, a menu key 32, an e-mail key 34, a camera key 36, a Web key 38, a call-start key 42, a clear key 44, a call-end/power key 46, a numeric keypad 48, and three function keys 51, 52, and 53. The numeric keypad 48 includes numeric keys of numbers 0 to 9 and other symbol keys. Each of the keys constituting the operation unit 12 may be an automatic-restoration switch of a push-button type. Since a function of each of the keys constituting the operation unit 12 may be similar to that of the general mobile phone, a detailed description of the function will be omitted. In FIG. 1, also, the character or the symbol engraved on a keytop of each of the keys constituting the operation unit 12 is appropriately simplified or omitted. Further, the operation unit 12 includes, in addition to the physical keys, a touchpad 54 provided where the physical keys are not arranged. The touchpad 54 enables a selection of an object displayed in the display 10 and a moving operation of a pointer and the like.

Figure 2:
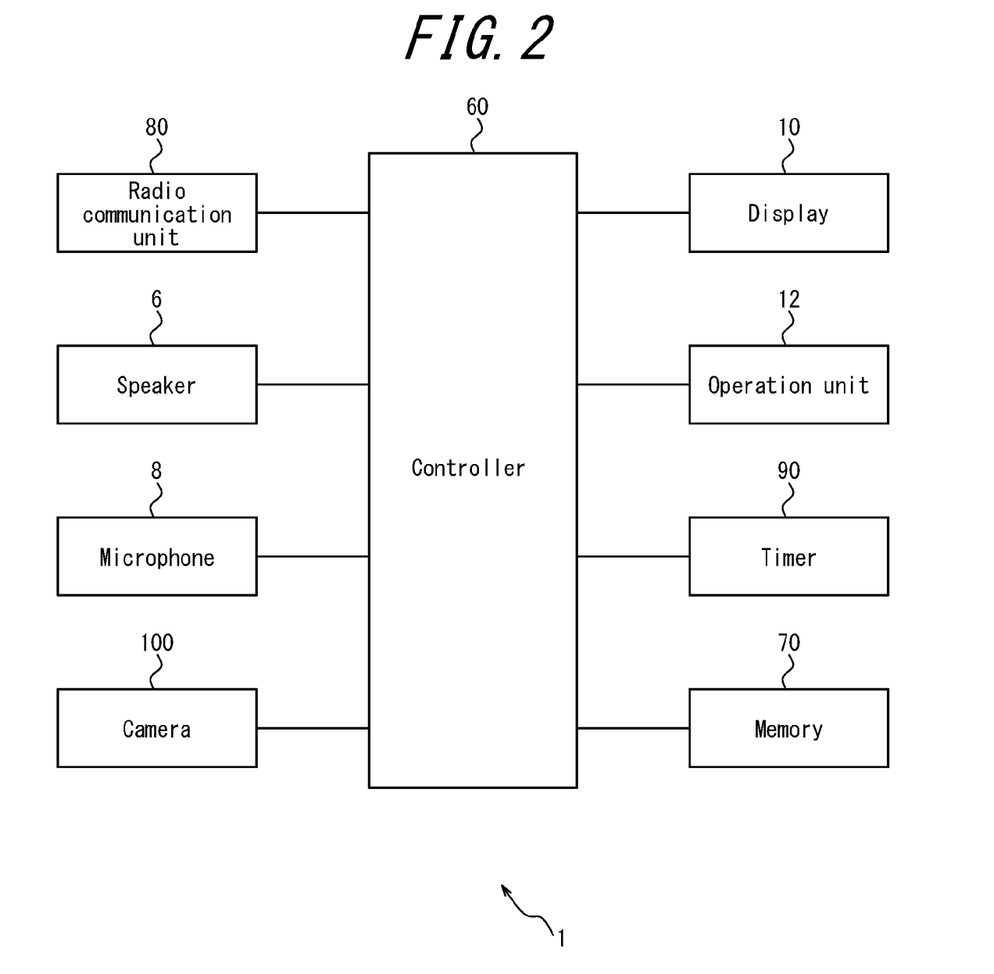
FIG. 2 is a block diagram illustrating a schematic configuration of the mobile terminal according to one embodiment.

FIG. 2 is a block diagram illustrating a schematic configuration of the mobile phone according to the present embodiment. As illustrated in FIG. 2, the mobile terminal 1, from a functional point of view, includes the display 10, the operation unit 12, and a controller 60. Also, the mobile terminal 1, as described referring to FIG. 1, in order to implement a function of the mobile phone, includes the speaker 6 and the microphone 8. As illustrated in FIG. 2, the mobile terminal 1 also includes a memory 70, a radio communication unit 80, and a timer 90. Further, the mobile terminal 1 may appropriately include a camera 100 for shooting a photograph or a video.

The controller 60 may be a processor for controlling and managing the mobile terminal 1 in its entirety including each functional block thereof. The controller 60 may be a processor such as a CPU for executing a program which defines a control procedure. The program executed by the controller 60 is stored in, for example, the memory 70 or an external storage medium.

The memory 70 may be a storage device such as a semiconductor memory and stores various information and a program and the like for operating the mobile terminal 1 and also functions as a work memory. The memory 70 may include, for example, RAM or ROM. The memory 70 stores, for example, a particular program corresponding to an application for controlling such that the controller 60 executes a particular function, text data such as e-mail, and image data.

The radio communication unit 80 connects to a communication network by performing a radio communication with, for example, a radio communication base station via an antenna and thus realizes functions of the mobile terminal 1 to make and receive the phone call, or to perform a data communication. Since the radio communication unit 80 may be constituted similarly to an element of a general smartphone or feature phone which realizes a radio communication function, a more detailed description of the radio communication unit 80 will be omitted.

The timer 90 counts a time (hereinafter, also referred to as a non-operation period) during which no input operation is performed to the operation unit 12.

The camera 100 is an element for realizing a function of a digital camera and capable of shooting a still image or the video. Data of the still image or the video shot by the camera 100 may be stored in, for example, the memory 70. Since the camera 100 may be constituted similarly to a camera of the general smartphone or feature phone, a more detailed description of the camera 100 will be omitted.

Figure 3:
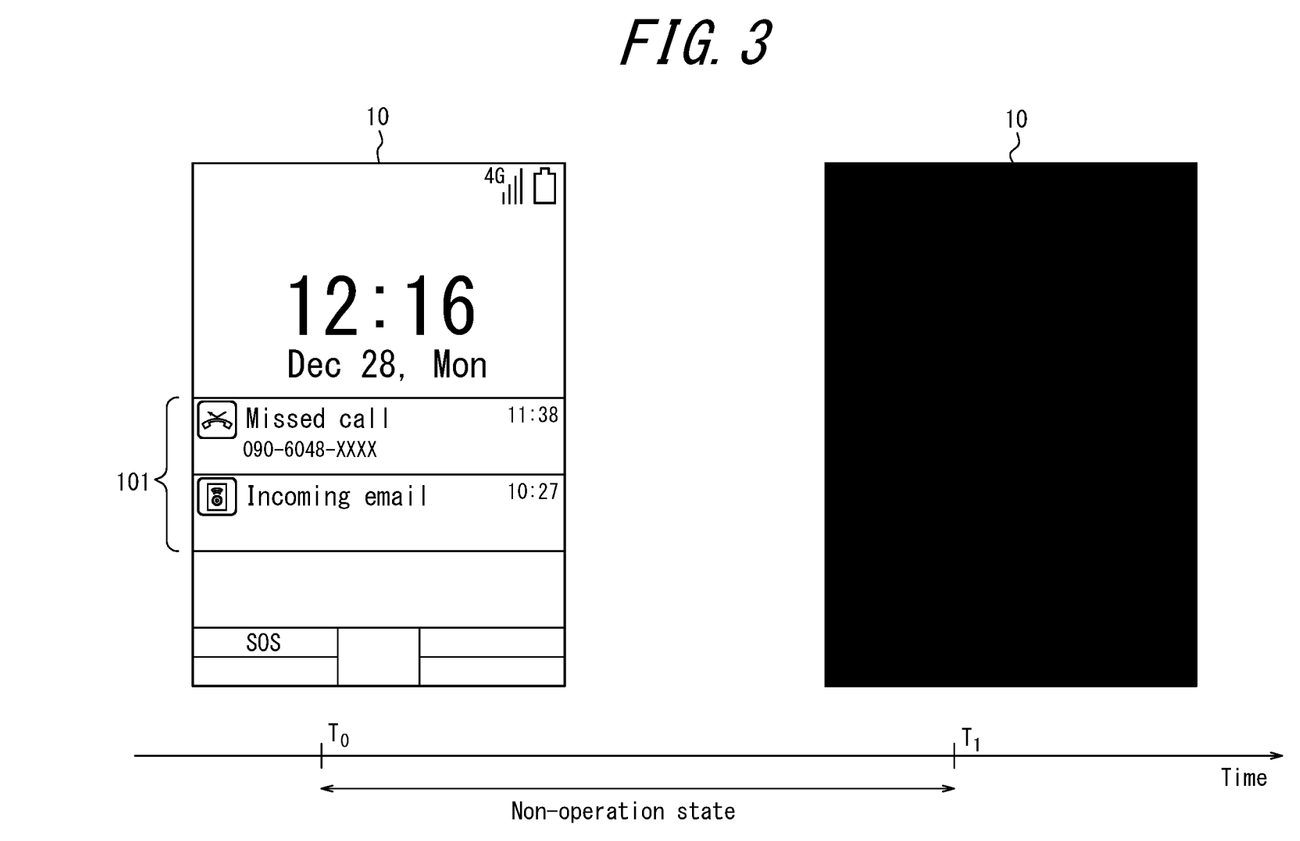
FIG. 3 is a diagram illustrating an overview of an operation performed when a lock screen is displayed.

Next, an operation of the mobile terminal 1 according to the present embodiment will be described. In the mobile terminal 1 according to the present embodiment, as an overview, the controller 60 sets the same time periods to a duration of the non-operation state in a lock screen before timeout is performed and a duration of the non-operation state in a screen other than the lock screen before the screen timeout is performed. FIG. 3 is a diagram illustrating an example in which the display 10 is displaying the lock screen. While the display 10 is displaying the lock screen, the controller 60 disables (locks) an operation to keys other than the center key 20, which is configured as one physical key, and the direction key 22. As illustrated in FIG. 3, the display 10 may display two notifications 101 respectively indicating a missed call and an incoming message on the lock screen. Note that the number of notifications 101 is not limited to two but may be one or more than two. When the operation unit 12 receives a short-pressing operation to the center key 20 while the lock screen is displayed, the controller 60 controls the display 10 such that the display 10 displays transition screens respectively corresponding to the notifications 101.

When the physical key is not operated between a time T0 at which the last operation is performed while the lock screen is displayed and a time T1 at which a predetermined time period T has elapsed after the time T0; that is, when the non-operation period continues for the predetermined time period T, the controller 60 performs the screen timeout. For example, when the display 10 is the liquid crystal display, the controller 60 performs the screen timeout by turning off backlight of the liquid crystal display. When the operation unit 12 is operated before the non-operation period continues for the predetermined time period T, the timer 90 restarts counting time of the non-operation period from when this operation of the operation unit 12 is performed. Note that an operation to a locked key may be detected as the operation of the operation unit 12. That is, upon operation of any physical key, the non-operation period is reset.

Figure 4:
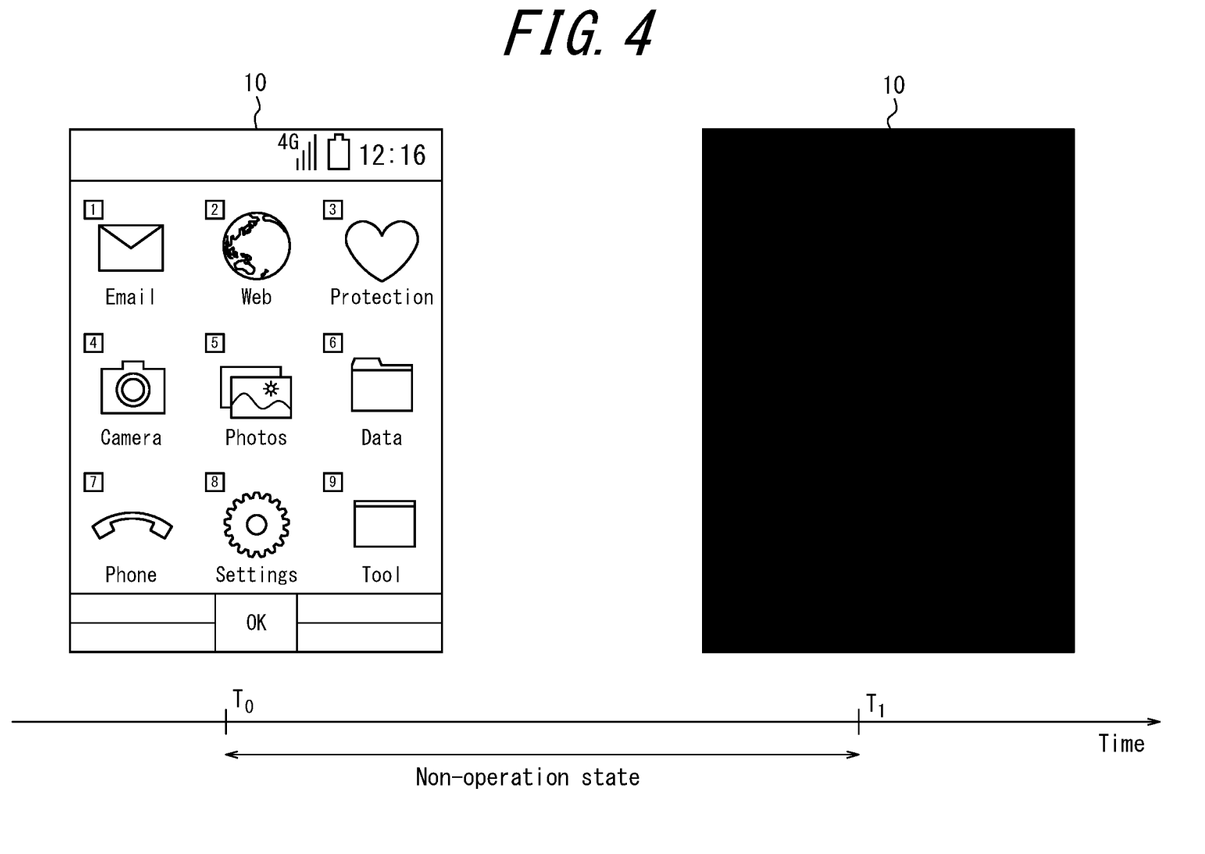
FIG. 4 is a diagram illustrating an overview of an operation performed when a menu screen is displayed.

Operations performed when a screen other than the lock screen is displayed will be described with reference to FIG. 4 and FIG. 5. FIG. 4 illustrates an example in which a menu screen is displayed in the display 10. The menu screen contains, for example, an application icon. When the physical key is not operated between the time T0 at which the last operation is performed and the time T1 at which the predetermined time period T has elapsed after the time T0; that is, when the non-operation period continues for the predetermined time period T, the controller 60 performs the screen timeout. For example, when the display 10 is the liquid crystal display, the controller 60 performs the screen timeout by turning off the backlight of the liquid crystal display. When the operation unit 12 is operated before the predetermined time period T has elapsed, the controller 60 resets the timer 90 such that the timer 90 restarts counting the time of the non-operation period from when this operation of the operation unit 12 is performed.

Figure 5:
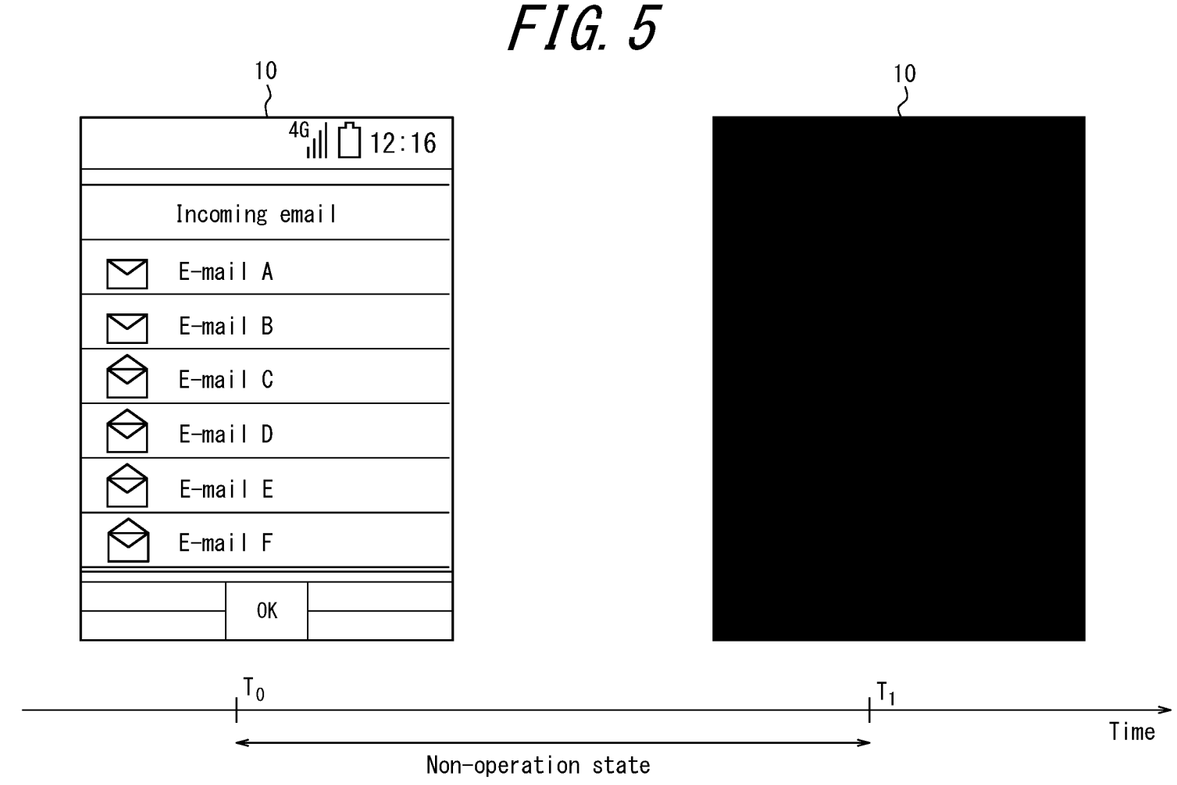
FIG. 5 is a diagram illustrating an overview of an operation performed when an e-mail screen is displayed.

FIG. 5 illustrates an example in which an e-mail screen is displayed in the display 10. The e-mail screen contains, for example, a list of incoming e-mails. When the physical key is not operated between the time T0 at which the last operation is performed and the time T1 at which the predetermined time period T has elapsed after the time T0; that is, when the non-operation period continues for the predetermined time period T, the controller 60 performs the screen timeout. For example, when the display 10 is the liquid crystal display, the controller 60 performs the screen timeout by turning off the backlight of the liquid crystal display. When the operation unit 12 is operated before the predetermined time period T has elapsed, the controller 60 resets the timer 90 such that the timer 90 restarts counting the time of the non-operation period from when this operation of the operation unit 12 is performed.

Note that, although the menu screen and the e-mail screen are used as screens other than the lock screen by way of example, the mobile terminal 1 operates similarly on any screen other than the lock screen.

Figure 6A:
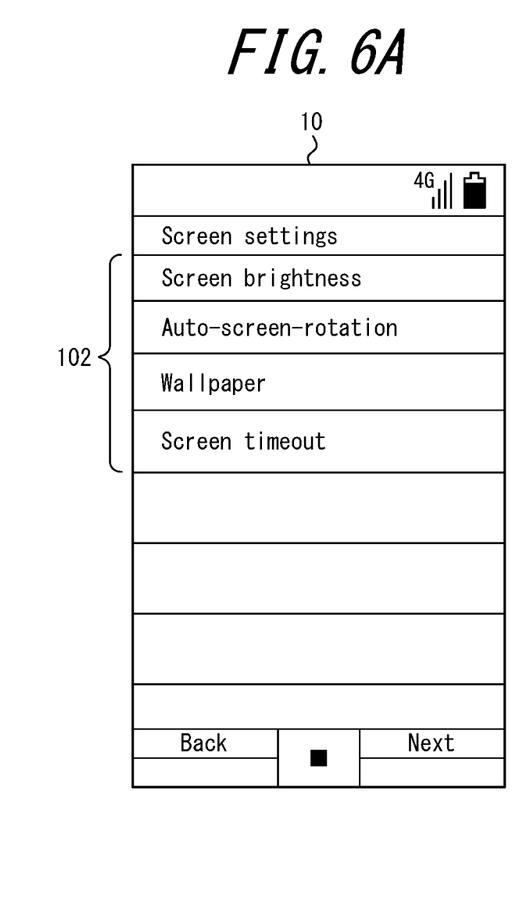
FIGS. 6A and 6B are diagrams illustrating setting screens of the mobile terminal according to one embodiment.
Figure 6B:
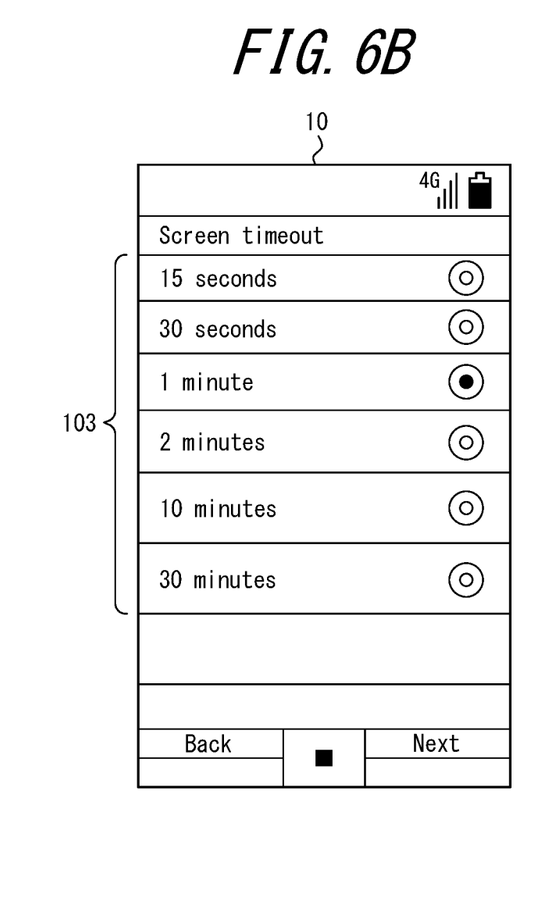

The predetermined time period T may be set by the user. FIGS. 6A and 6B illustrate examples of setting screens displayed in the display 10. The setting screen in FIG. 6A displays a list 102 of setting fields associated with brightness of the display, auto-screen-rotation, wallpaper, and screen timeout. The user may select any setting field and change settings thereof. FIG. 6B is a setting screen of the screen timeout displayed when the user selects the setting field associated with the screen timeout. In this example, the user may select, as desired, a duration before the screen timeout is performed from 15 seconds, 30 seconds, 1 minute, 2 minutes, 10 minutes, and 30 minutes. In particular, the user sets the duration by ticking a radio button of time of choice from a list 103 of the screen timeout. When the operation unit 12 detects an input by the user, the controller 60 determines the duration before the screen timeout is performed based on a result of the detection by the operation unit 12. In the example illustrated in FIG. 6B, 1 minute is selected as the duration before the screen timeout is performed. In this case, the controller 60 sets the predetermined time period T to 1 minute. The controller 60 stores the predetermined time period T thus set in the memory 70.

Although FIG. 6B illustrates a mode to make a selection from 15 seconds, 30 seconds, 1 minute, 2 minutes, 10 minutes, and 30 minutes, options are not limited thereto. Also, the number of options is not limited to six. For example, an interface may be provided to allow an input with a numeric keypad to set any duration before the screen timeout is performed. Or, an interface may be provided to allow an increase or decrease in the duration before the screen timeout is performed in increments or decrements of a certain second(s) (e.g. 1 second).

Figure 7:
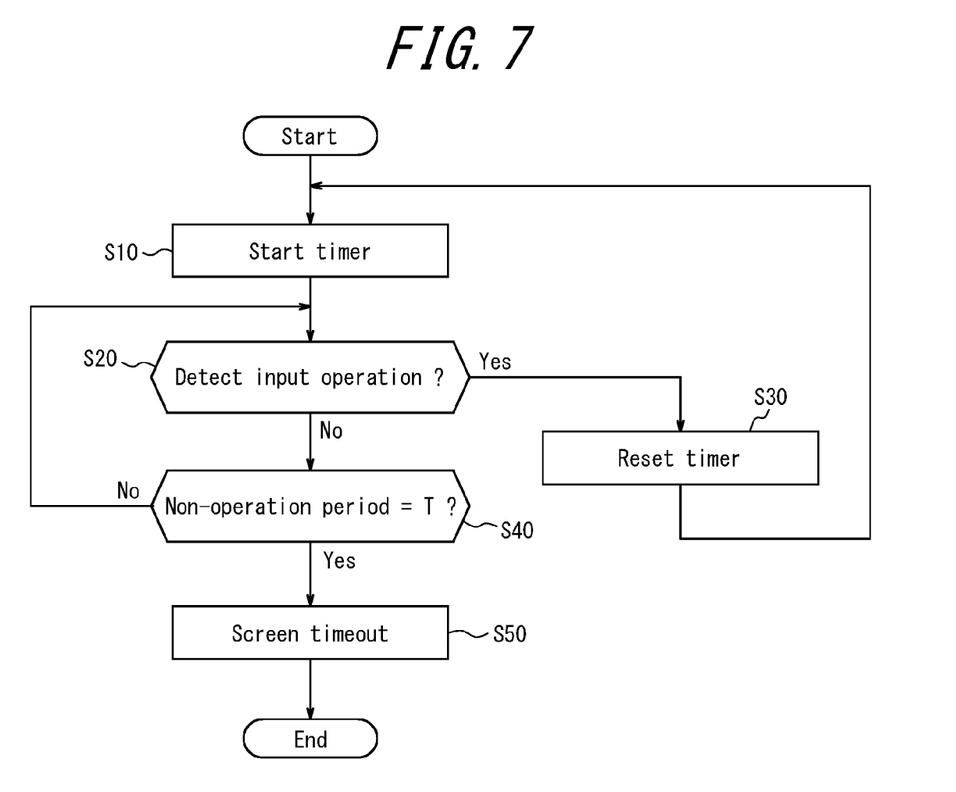
FIG. 7 is a flowchart illustrating an operation of the mobile terminal according to one embodiment.

Next, an operation of the mobile terminal 1 according to one embodiment will be described with reference to a flowchart illustrated in FIG. 7. Note that a screen displayed in the display 10 at the start of the operation of the mobile terminal 1 may be either the lock screen or a screen other than the lock screen. That is, regardless of a screen being displayed, the mobile terminal 1 operates following the flowchart of FIG. 7.

First, the controller 60 of the mobile terminal 1 controls the timer 90 such that the timer 90 starts counting the time from when the last input operation is performed (step S10). Next, the controller 60 determines whether the operation unit 12 has detected an input operation (step S20). When there is an input operation, the controller 60 resets the timer 90 (step S30) and returns to step S10 such that the timer 90 restarts counting from 0.

When there is no input operation at step S20, the controller 60 determines whether the time (the non-operation period) counted by the timer 90 has reached the T (step S40). When the non-operation period has not reached the T, the controller 60 returns to step S20 to perform the above determination. When the non-operation period has reached the time T (Yes at step S40), the controller 60 performs the screen timeout (step S50). Then, the operation ends.

According to the mobile terminal 1 of one embodiment, the same time periods T are set to the duration of the non-operation state in the lock screen before the screen timeout is performed and the duration of the non-operation state in a screen other than the lock screen before the screen timeout is performed. This configuration may reduce user's discomfort before the screen timeout is performed.

According to the mobile terminal 1 of one embodiment, also, the screen timeout may be performed at timing of the user's choice. Therefore, when the notification 101 is displayed on the lock screen as illustrated in FIG. 3, convenience in viewing the notification 101 may be improved. For example, by setting the predetermined time (the duration of the non-operation state before the screen timeout is performed) to 1 minute, the user may take his/her time in viewing the notification 101.

According to the mobile terminal 1 of one embodiment, further, the predetermined time period T associated with the screen timeout while any screen is displayed may be set in one setting field (the setting field associated with the screen timeout). Also, the duration of the non-operation state before the screen timeout is performed set in the setting field is used as the predetermined time T in any screen including the lock screen. Since one setting field allows collective settings of the screen timeout as described above, convenience may be improved.

Here, a computer may be preferably employed to function as the mobile terminal 1. Such a computer may realize the disclosure by storing a program containing a description of an operation to realize each function of the mobile terminal 1 in a storage unit of the computer and controlling such that the central processing unit (CPU) of the computer reads and executes the program.

Although the disclosure has been described based on the figures and the embodiment, it is to be understood that various modifications and changes may be implemented by those who are ordinarily skilled in the art based on the disclosure. Accordingly, such modifications and changes are included in the scope of the disclosure. For example, functions and the like included in each means and step may be rearranged without logical inconsistency, so as to combine a plurality of means or steps together or to separate them.

For example, although in the present embodiment the mobile terminal 1 of the feature-phone type is used by way of example, the mobile terminal 1 is not limited thereto but may be of other types such as a smartphone type and a tablet type.

Also, although in the present embodiment the controller 60 performs the screen timeout when the predetermined time period T has elapsed, the controller 60 may, for example, reduce brightness of the display before the predetermined time period T has elapsed and performs the screen timeout when the predetermined time period T has elapsed. For example, when the display 10 is the liquid crystal display, brightness of backlight is reduced in stages. In particular, when the predetermined time period T is 1 minute, the brightness is reduced to 80% when 50 seconds has elapsed, and to 40% when 55 seconds has elapsed. This configuration enables the user to easily know timing of the screen timeout, improving convenience. For example, when the brightness of a screen is reduced while the user is viewing a notification or the like on the lock screen, the user may perform an input operation to reset the timer 90 and appropriately postpone the screen timeout. Although the brightness is reduced in three stages in the above example, the number of stages is not limited thereto but may be four or more, or two or less.

The invention claimed is:

1. A mobile terminal comprising:
   a display configured to display a lock screen and a screen other than the lock screen wherein the display displays at least one notification on the lock screen; and
   a controller configured to receive a setting for a predetermined time period to perform screen timeout when a non-operation state continues for the predetermined time period in the screen other than the lock screen, wherein
   the controller also performs screen timeout when the setting is received and a nonoperation state continues for the predetermined time period in the lock screen, and sets the predetermined period of the non-operation state in the lock screen before the screen timeout is performed and a predetermined time for non-operation state in the screen other than the lock screen before the screen timeout is performed to be same, and
   the controller controls the display to continue displaying the lock screen with the at least one notification until a duration of a non-operation state in the lock screen reaches the predetermined time period set by the user.

2. The mobile terminal according to claim 1, wherein the predetermined time period can be set based on one input operation performed by a user.

3. The mobile terminal according to claim 2, wherein the predetermined time period can be set in one setting field.

4. A display control method of a mobile terminal comprising:
   displaying a lock screen and a screen other than the lock screen;
   displaying at least one notification on the lock screen;
   receiving a setting for a predetermined time period to perform screen timeout when a non-operation state continues for the predetermined time period in the screen other than the lock screen;
   performing screen timeout when the setting is received and a non-operation state continues for the predetermined time period in the lock screen, wherein the predetermined time period of the non-operation state in the lock screen is set before the screen timeout is performed and a predetermined time for non-operation state in the screen other than the lock screen before the screen timeout is performed to be same; and
   continue displaying the lock screen with the at least one notification until a duration of a non-operation state in the lock screen reaches the predetermined time period set by the user.

5. A non-transitory computer-readable recording medium including computer program instructions, which when executed by a computer for functioning as a mobile terminal, cause the computer to:
   display a lock screen and a screen other than the lock screen;
   display at least one notification on the lock screen;
   receive a setting for a predetermined time period to perform screen timeout when a non-operation state continues for the predetermined time period in the screen other than the lock screen;
   perform screen timeout when the setting is received and a non-operation state continues for the predetermined time period in the lock screen, wherein the predetermined time period of the non-operation state in the lock screen is set before the screen timeout is performed and a predetermined time for non-operation state in the screen other than the lock screen before the screen timeout is performed to be same; and
   continue to display the lock screen with the at least one notification until a duration of a non-operation state in the lock screen reaches the predetermined time period set by the user.

* * * * *